United States Patent [19]

Mills

[11] Patent Number: 4,531,684

[45] Date of Patent: Jul. 30, 1985

[54] APPARATUS HAVING IMPROVED FILM TAKE-UP SPOOL

[75] Inventor: Loring K. Mills, Hampton, N.H.

[73] Assignee: Polaroid Corporation, Cambridge, Mass.

[21] Appl. No.: 565,961

[22] Filed: Dec. 27, 1983

[51] Int. Cl.[3] ........................ G03B 1/04; G03B 17/26; B65H 75/28

[52] U.S. Cl. .................................. 242/71.1; 242/68.5; 242/74.2; 354/212

[58] Field of Search .................... 242/68.5, 71.1, 71.2, 242/74, 74.1, 74.2; 354/212, 275

[56] References Cited

U.S. PATENT DOCUMENTS

| | | | |
|---|---|---|---|
| 117,630 | 8/1871 | Hillard | 242/74.1 |
| 1,216,967 | 2/1917 | Dunavant | 242/74.2 |
| 1,261,872 | 4/1918 | Tompkins | 242/68.5 |
| 3,433,143 | 3/1969 | Lieser et al. | 242/71 X |
| 4,303,325 | 12/1981 | Seely | 354/212 |
| 4,314,751 | 2/1982 | Harvey | 354/212 |
| 4,371,249 | 2/1983 | Czumak et al. | 354/304 |
| 4,397,535 | 8/1983 | Harvey | 354/212 |
| 4,411,509 | 10/1983 | Shirai | 354/212 |
| 4,451,011 | 5/1984 | Engelsmann et al. | 242/74 X |

FOREIGN PATENT DOCUMENTS

| | | | |
|---|---|---|---|
| 565018 | 11/1932 | Fed. Rep. of Germany | 242/71.1 |
| 655825 | 4/1929 | France | 242/74.1 |
| 834136 | 5/1960 | United Kingdom | 242/74.2 |

*Primary Examiner*—Stuart S. Levy
*Assistant Examiner*—Lloyd D. Doigan
*Attorney, Agent, or Firm*—Alfred E. Corrigan

[57] ABSTRACT

Apparatus for receiving a film cassette containing a roll of film, and a film take-up spool mounted within the apparatus and constructed so as to facilitate the attachment of a leading end (leader) of the film thereto. The take-up spool includes a first member which is rotatably supported within the apparatus and a second member which is pivotably connected to one end of the first member for movement between a first position wherein the leader may be laid across the first member and a second position in which the leader is clamped between the first and second members. The second member is moved into the second position in response to the closing of a loading door.

6 Claims, 3 Drawing Figures

APPARATUS HAVING IMPROVED FILM TAKE-UP SPOOL

BACKGROUND OF THE INVENTION

1. Field of the Invention

This invention relates to apparatus having means for facilitating the attachment of a leader of a roll of photographic film to a film take-up spool.

2. Description of the Prior Art

The present invention relates to apparatus which are adapted to receive a film cassette containing a roll of photographic film, e.g., a film processor such as is described in U.S. Pat. No. 4,371,249, or a photographic camera such as is described in U.S. Pat. Nos. 4,411,509 4,397,535, 4,314,751, 4,303,325, and 3,433,143, and more particularly to such an apparatus having a film take-up spool to which a leader of the film may be secured with a minimum of effort. While each of the apparatus described in the foregoing patents includes means for facilitating the attachment of a film leader to a film take-up spool, they all have one or more drawbacks. For example, in the processor described in the '249 patent, the operator must manually align an aperture in the film leader with a pin which extends radially from the take-up spool, a not too small of a feat when being performed under low light conditions or by an operator having poor eye sight. The same may be said of the camera described in the '143 patent wherein a leader must be inserted into a slit in a take-up spool. As regard the cameras described in the remaining patents, they are adapted for use solely with film having an aperture in its leader, which aperature is adapted to receive a protuberance on a take-up spool. Still further, they require guides to insure alignment between the aperture and the protuberance during movement of the leader toward the take-up spool and drive systems for so moving the film leader and rotating the take-up spool, items which add to the cost of the camera.

From the foregoing, it can be readily seen that there is a need for a simple and inexpensive means for facilitating the connection of a film leader to a take-up spool in a manner which requires a minimum of dexterity and visual observation.

SUMMARY OF THE INVENTION

The instant invention relates to apparatus for receiving a film cassette containing a roll of photographic film and more particularly to such an apparatus having a film take-up spool to which a leader of the film may be readily attached.

The apparatus, in its preferred embodiment, comprises a film processor, similar to that disclosed in the '249 patent, having a housing which is adapted to be rendered lighttight by moving a film loading door into a closed position. The film processor includes a first station at which a disposable film processing kit may be positioned, a second station which is adapted to receive a film cassette containing a roll of exposed transparency film of the instant or self-developing type, a film take-up spool and a motor.

The film take-up spool includes a first member, which is rotatably supported within the housing at a location adjacent to the second station, and a second member which is pivotally coupled to one end of the first member for movement between first and second positions. The end of the first member opposite to the end to which the second member is pivotally coupled is provided with a recess which is adapted to receive the free end of the second member when the latter is in the second position.

The disposable processing kit includes a roller upon which is coiled a length of flexible sheet material, e.g. a polyester film such as Mylar, having a gelatin coating on one side thereof, and a liquid applicator containing a supply of processing liquid. One end of the sheet material is attached to the roller while its opposite end (leader) extends under the liquid applicator's nozzle. Upon positioning the disposable processing kit at the first station, the operator will thread the leader between a pair of laminating rollers and then it is laid across the first member in a direction generally perpendicular to its rotational axis while the second member of the take-up spool is in the first position. Next, a film cassette containing a roll of previously exposed photographic film is loaded into position at the second station and the film's leader is threaded between the laminating rollers with its emulsion layer facing the gelatin coated surface of the sheet material (Mylar). The film's leader is then laid across the first member of the take-up spool in the same manner as that described for the leader of the sheet material.

Once the two leaders have been positioned as described, the operator may now move the loading door into its closed position thereby rendering the housing lighttight. During such closing, an arm having one end pivotally mounted on an interior surface of the door has its free end moved into engagement with the second end of the second member of the take-up spool. Continued closing movement of the door causes the free end of the arm to move the second member into its second position wherein it cooperates with the first member to clamp the superposed leaders therebetween. The motor is then energized so as to drive the take-up spool in a direction which will withdraw the film from its cassette and the sheet material from its roller while simultaneously wrapping the superposed leaders about the take-up spool. During such movement of the sheet material, the nozzle of the liquid applicator is opened thereby permitting a layer of processing liquid to be applied to the gelatin coated surface of the sheet material prior to it being superposed with the film as they pass between the laminating rollers.

As previously mentioned, when the second member of the take-up spool is in the second position, its second end is located wholly within the recessed portion in the second end of the first member. The second end of the first member is located within a U-shaped member which prevents the second member from pivoting out of the recess under the bias of a spring during a major portion of the first revolution of the take-up spool. More specifically, the first and second members are maintained in the second position during the first forty-five degrees of rotation of the take-up spool by the contact between the end of the arm on the door and the peripheral surface of the second end of the second member. During the next two hundred and seventy degrees of rotation, the facing surface of the U-shaped member functions to prevent movement of the second end of the second member out of the recess. Further rotation of the take-up spool results in the peripheral surface of the second end of the second member moving into a position where it is again confronted by the free end of the arm. Also, at this time there is almost a complete convolution of the laminate comprised of the sheet material and the film wrapped around the take-up spool, and this convolution helps in maintaining the two members of the take-up spool in clamping relation with the aforementioned leaders.

The laminate is wound upon the take-up spool until the motor is turned off in response to a signal which indicates that the proper length of the film has been wound upon the take-up spool. Suitable means, e.g. a timer is started to count down the time that the laminate will remain on the take-up spool until the processing liquid has imbibed the film for a period the time sufficient to form visible images in the film. At the end of this period of time, the timer instructs the motor to turn on and its output is directed to the sheet material roller and the film spool so as to drive them in a direction which will remove or unwind the laminate from the take-up spool and strip the sheet material from the film while simultaneously rewinding the sheet material upon its roller and the film upon its spool. When the laminate has been completely unwound from the take-up spool and the motor turned off, the second end of the second member of the take-up spool is located adjacent to the end of the arm. Thus, when the operator opens the loading door, the second member automatically moves into the first position thereby releasing the grip on the two leaders. The processing kit and the film cassette containing the processed film may now be removed from the processor.

An object of the invention is to provide an apparatus of the type which is adapted to receive a roll of photographic film with means for readily attaching a leader of the film to a film take-up spool.

Another object of the invention is to provide a film take-up spool which will automatically grasp a leader of a roll of film upon a film loading door of the apparatus being moved into a closed position.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying, drawings wherein.

DETAILED DESCRIPTION OF THE INVENTION

Figure 2:
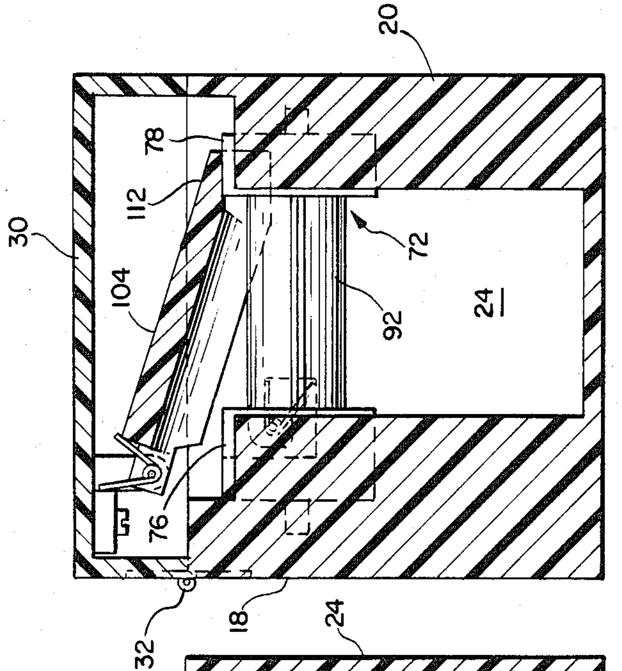
FIG. 2 is an end elevational view taken generally along the line 2—2 of FIG. 1 with the film loading door in its closed position.

Reference is now made to the drawings wherein is shown an apparatus in the form of a film processor 10 which is adapted to receive a film cassette 12 for the processing of a length of photographically exposed film 14 contained within the film cassette 12. The film processor 10 includes a main housing 16 having a pair of side walls 18 and 20 which are interconnected by a pair of end walls 22 and 24 and a bottom wall 26 to define a chamber 28. The chamber 28 is adapted to be rendered lighttight by a film loading door 30 which is pivotally coupled to the top of the side wall 18 by a piano type hinge 32.

The processor 10 includes a first station defined in part by a platform 34 having a recessed area 36 which is configured to receive a disposable film processing kit 38. The processing kit 38 includes a housing 40 in which a roller 42 is rotatably supported and a processing liquid applicator 44 having a nozzle 46 through which a processing liquid 48 may be applied to a gelatin coated surface of a flexible sheet material 50, e.g., Mylar. One end of the sheet material 50 is attached to the roller 42 while the other end thereof extends across a laterally extending slot 52 in the housing 40 and below the nozzle 46 to a point where it exits from the housing 40 via a laterally extending slot 54 in a wall 56 of the housing 40. A spring biased platen 58 mounted within a recess 60 in the platform 34 urges sheet material 50 into engagement with the nozzle 46. The nozzle 46 may be initially closed by any suitable means, e.g., a strip of flexible material (not shown) which is secured across the nozzle 46 and to the sheet material 50 at a location where the nozzle 46 will be opened after a predetermined length of sheet material has been unwound from the roller 42 or withdrawn from the housing 40.

The processor 10 includes a second station at which the film cassette 12 may be located. The ends of the film cassette 12 are adapted to be supported by cradle type members 62 (only one of which is shown) which extend inwardly from the side walls 18 and 20. Each cradle type member 62 includes a recess 64 which is configured so as to receive the ends of the- film cassette 12 is only one orientation. Extending between the cradle type members 62 is a pair of juxtaposed rollers 66 and 68. The roller 66 is mounted for rotation about a fixed axis while the roller 68 is mounted for veritical movement toward and away from the roller 66 as well as for rotation about its longitudinal axis. A spring 70 resiliently biases the roller 68 toward the roller 66.

Figure 1:
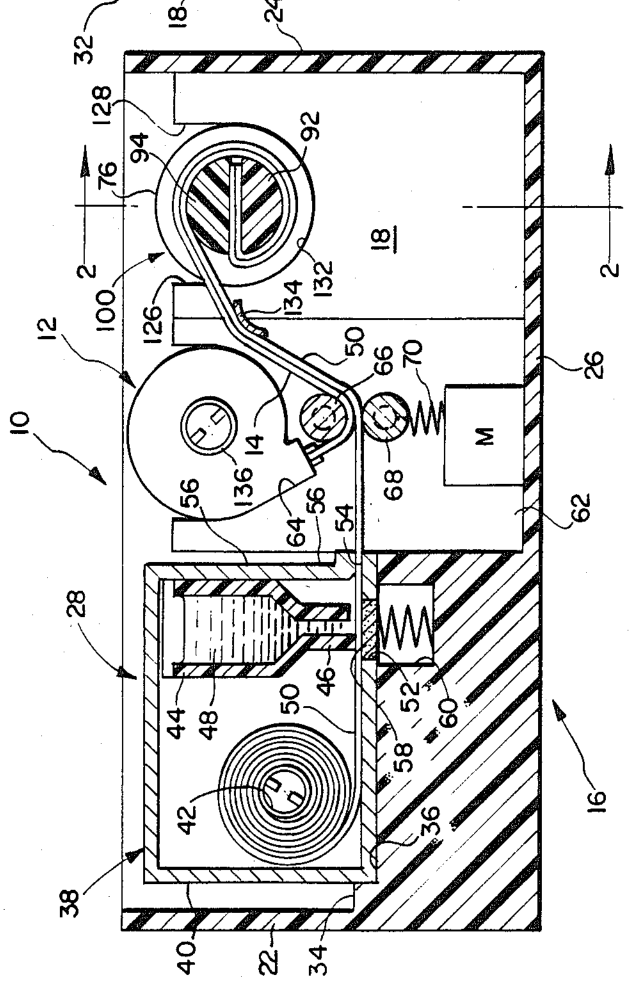
FIG. 1 is a side elevational view, partly in section, of a film processor, the processor being shown with its film-loading door in an open position.
Figure 3:
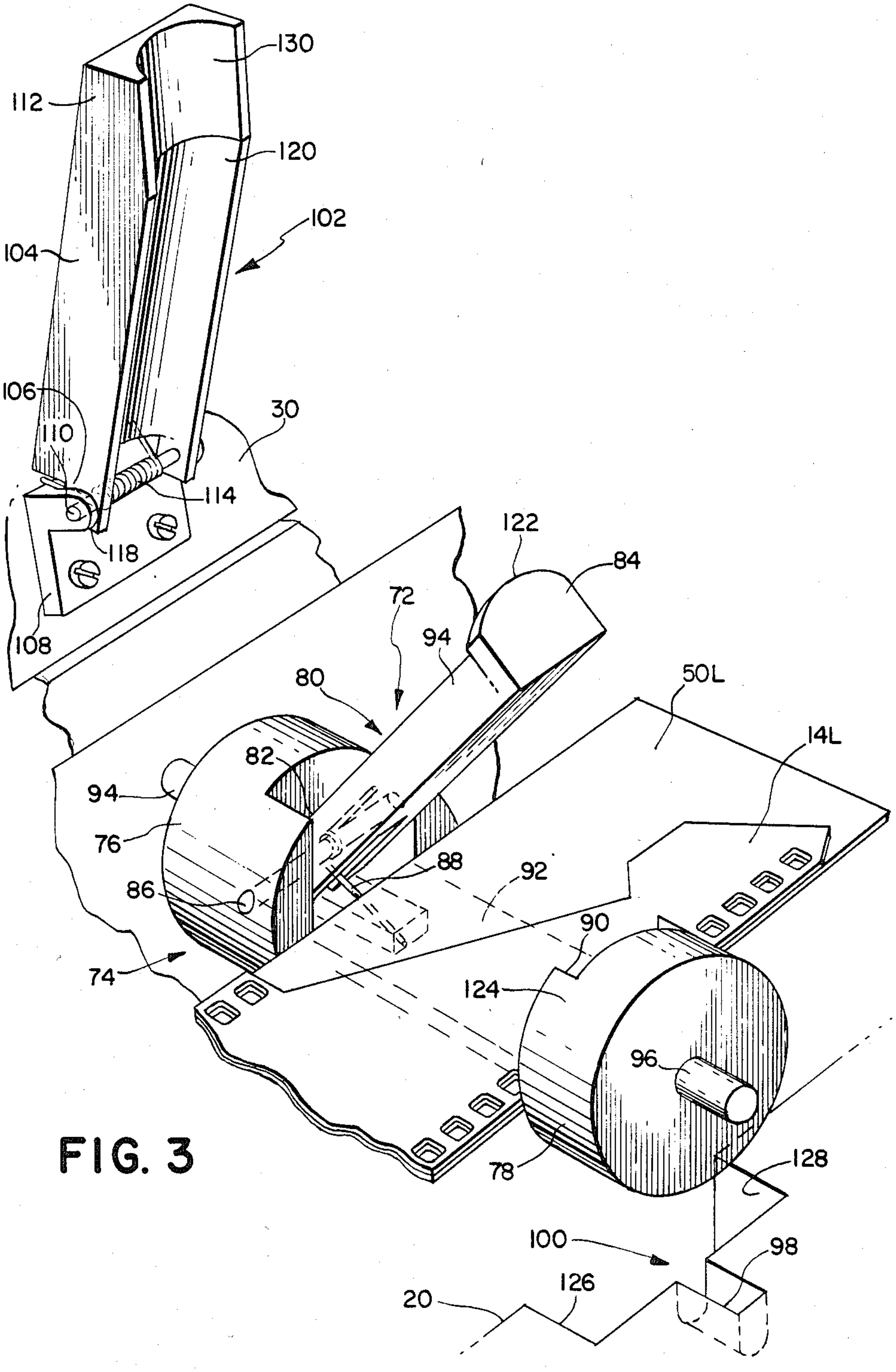
FIG. 3 is an enlarged perspective view showing the relationship between a film take-up spool and an arm which is mounted on an interior surface of the processor's film loading door.

The processor 10 also includes a film take-up spool 72. As best shown in FIG. 3, the take-up spool 72 includes a first member 74 having first and second opposite ends 76 and 78, respectively, and a second member 80 having first and second opposite ends 82 and 84, respectively. The second member 80 has its first end 82 pivotally coupled to the first end 76 of the first member 74 by a pin 86. Also, the second member 80 is resiliently biased into a first position, shown in FIG. 3, by a torsion spring 88. The second member is adapted to be moved into a second position, as shown in FIGS. 1 and 2, in response to moving the loading door 30 into its closed position, as shown in FIG. 2. As the second member 80 approaches the second position, its second end 84 enters a recess 90 in the peripheral surface of the second end 78 of the first member 74. Thus located, intermediate portions 92 and 94 of the first and second members 74 and 80, respectively, define a body having a cylindrical configuration about which the film 14 and the sheet material 50 are to be wound. The first member 74 is mounted between the side walls 18 and 20 for rotation about the longitudinal axis of the take-up spool 72 by a pair of journals 94 and 96 which are adapted to be secured within recesses (only one being shown) 98 formed within the side walls 18 and 20. Suitable drive means, not shown, may extend between a motor M and one of the journals 94 and 96 for rotating the take-up spool in a clockwise direction, as viewed in FIG. 1. Each of the side walls 18 and 20 also includes a U-shaped recess 100 which is adapted to rotatably receive one of the opposite ends of the first member 74.

While the movement of the second member 80 into the second position may be accomplished manually and it may be releasably maintained therein frictionally, it is preferred that such movement be in response to the movement of the loading door 30 into its closed position. Accordingly, means 102 for moving the second member 80 into the second position is mounted on an interior surface of the loading door and takes the form of an arm 104 having one end 106 pivotally coupled to a mounting plate 108 by a pivot pin 110, and an opposite end 112. Suitable means such as a torsion spring 114 surrounds the pin 110 and has its opposite ends in engagement with the mounting plate 108 and the arm 104 for resiliently biasing the latter in a clockwise direction, as viewed in FIGS. 2 and 3, until a stop in the form of an extension 118 of the arm 104 engages the mounting plate 108. Principally, the spring 114 provides for tolerance variations which may be caused by the arm 104 rotating about the pin 110 while the door 30 is rotating about its hinge 32; and it insures that a curved surface 120 of the arm 104 will engage a peripheral surface 122 of the second end 84 of the second member 80 and move the latter into its second position wherein the peripheral surface 122 substantially forms a continuation of a peripheral surface 124 of the second end 78 of the first member 74.

When the arm 104 is holding the second member 80 of the take-up spool 72 in its second position, i.e., in clamping relation to the first member 74 it also functions, in combination with the U-shaped recess 100 in the wall 20, to ensure that the second member 80 does not move away from the first member 74 until the former is located adjacent to the arm 104 and the loading door 30 is moved toward its open position. Specifically, when the loading door 30 is in the closed position, the end 112 of the arm 104 is located between opposite walls 126 and 128 of the U-shaped recess 100 with an end section 130 of the curved surface 120 in engagement with the peripheral surface 124 of the second end 78 of the first member 74. With the arm 104 thus positioned, the peripheral surface 122 of the second end 84 of the second member 80 is also in engagement with the end section 130 and member 80 cannot leave the recess 90. As the take-up spool 72 is driven by the motor M in a clockwise direction, the peripheral surface 122 of the end 84 of the second member 80 moves out of engagement with the curved surface 130 and substantially simultaneously into engagement with the side wall 128 of the U-shaped recess 100. Continued clockwise rotation of the take-up spool 72 results in the peripheral surface 122 moving into engagement with the bight surface 132 of the U-shaped recess 100 and then the wall 126. Finally, as the take-up spool 72 approaches the completion of its first revolution, the peripheral surface 122 moves out of engagement with the wall 126 and simultaneously into engagement with the curved surface 130 of the arm 104. Without showing the arm 104, this moment in the winding of the film 14 and sheet material 50 is depicted in FIG. 1. Thus, it can be seen that the curved surface 130 of the arm 104 cooperates with the walls of the U-shaped recess 100 to keep the second member 80 in the second position during rotation of the take-up spool 72. Also, at this time the first convolution of the laminate, comprised of the film 14 and the sheet material 50, wound about the take-up spool 82 aids in maintaining the second member 80 in the second position.

In the operation of the processor 10, the operator moves the loading door 30 to its open position and positions a disposable processing kit 38 on the recessed portion 36 of the platform 34. The end or leader 50L of the sheet material 50, which is located exteriorly of the kit 38, is then threaded between the marrying rollers 66 and 68, trained over a curved guide 134, and then laid across the intermediate portion 92 of the first member 74 of the take-up spool 72 with the longitudinal axis of the leader 50L substantially perpendicular to the axis of the spool. The threading of the leader 50L between the rollers 66 and 68 may be facilitated by manually depressing the roller 68 against the bias of the spring 70 with one hand while threading the leader 50L between the rollers with the other hand. During such manipulation of the leader 50L, a predetermined length of sheet material 50 is withdrawn from the housing 40, such length being sufficient to remove a seal from the discharge end of the nozzle 46, as previously described. Next, a film cassette 12 containing a roll of exposed film 14 is positioned as shown in FIG. 1 by the cradle type members 62. The end or leader 14L of the film 14 is then threaded between the rollers 66 and 68, trained over the guide 134, and then laid across the intermediate portion 92 of the first member 74, as shown in FIG. 3. Thus, the emulsion side of the film 14 is located in engagement with the soon to be coated gelatin surface of the sheet material 50. During the loading of the kit 38 and the film cassette 12, drive members (not shown) are coupled to the roller 42 and to the film spool 136. The loading door 30 is then moved into its closed position thus rendering the chamber 28 lighttight while simultaneously causing the arm 104 to move the second member 80 of the take-up spool 72 from its first position (FIG. 3) to its second position (FIG. 2) wherein it cooperates with the first member 74 to clamp the leaders 14L and 50L therebetween. The motor M is then energized to drive the take-up spool 72 in a clockwise direction thereby winding a laminate comprised of the film 14 and sheet material 50 upon the take-up spool 72 while simultaneously unwinding the sheet material 50 from its roller 42 and the film 14 from its spool 136. As the sheet material 50 passes beneath the nozzle 46, a layer of processing liquid 48, e.g., an aqueous composition containing alkali, a silver halide developing agent and a silver halide solvent, is applied to the gelatin coated surface thereof prior to it being laminated to the emulsion side of the film 14 as they pass between the rollers 66 and 68. After a predetermined period of time the motor M is deenergized and the laminate of the film 14 and sheet material 50 having a layer of processing liquid therebetween is allowed to remain on the take-up spool 72 for a period of time until the formation of visible images within the film 14 has taken place, e.g., one minute. The motor M is again energized. However, at this time its output is now directed away from the take-up spool 72 and to the aforementioned drives for the roller 42 and film spool 136 so as to drive them in a clockwise direction. As the laminate is unwound from the take-up spool 72 (which is now rotating in a counterclockwise direction under the pulling force on the laminate) and moved between the rollers 66 and 68 the film 14 is stripped from the sheet material 50 and rewound upon its film spool 136 while the sheet material 50 containing the stripped emulsion layer of the film 50 is wound upon the roller 42. The motor M is deenergized at the moment that the laminate is completely unwound from the take-up spool 72 and the second end 84 of the member 80 of the spool 72 is located in engagement with the arm 104. The guide 134, whose horizontal portion is located substantially in the same plane as that occupied by the facing surfaces of the intermediate portions 92 and 94 when such surfaces are in a horizontal plane, functions to aid in the take-up spool 72 stopping with the second end 84 of the member second 80 located in engagement with the arm 104 by virtue of the force on the laminate being in a substantially horizontal plane at the end of the unwinding process. The loading door 30 may now be opened thereby automatically allowing the second member 80 of the take-up spool 72 to pivot into its first position under the bias of the spring 88. The operator may now remove the film cassette 12 containing the fully developed film 14. Also, the kit 38 may be removed and any sheet material 50 remaining outside of the housing may be rewound upon its roller 42 by manually rotating the latter.

While the above invention has been described as a film processor it should be noted that the apparatus embodying the invention may also take the form of a camera or camera back having the above-described take-up spool and wherein only a film cassette containing a roll of unexposed film would be loaded into the camera with its leader laid across the first member of the spool. The second member of the take-up spool may then be manually moved into the second position to thereby clamp the film leader therebetween or such movement may be accomplished in response to the closing of the camera's film loading door.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Apparatus for receiving a film cassette containing a roll of photographic film including a leader which is adapted to extend to the exterior of the film cassette for attachment to a film take-up spool, said apparatus comprising:

a housing;

a loading door attached to said housing for movement between an open position, wherein a film cassette may be located within said housing, and a closed position;

means within said housing for supporting a film cassette containing a roll of film including a leader;

a film take-up spool rotatably mounted within said housing, said take-up spool having a longitudinal axis about which it is adapted to be rotated, said film take-up spool including a first member and a second member coupled to said first member for movement between a first position, wherein the leader of the film may be laid across said first member in a direction generally perpendicular to said longitudinal axis, and a second position, wherein said first and second member cooperate with each other to clamp the leader therebetween;

means for moving said second member into said second position;

means for rotating said take-up spool in a first direction so as to wind the film about said take-up spool; and means for aiding said take-up spool in stopping its rotation in a second direction, generally opposite to said first direction, with said second end of said second member located in engagement and alignment with said moving means, whereby upon moving said loading door into said open position and said moving means away from said second member, said second member may be moved into said first position so as to facilitate the removal of the film leader from said take-up spool.

2. Apparatus as defined in claim 1 further including means for biasing said second member into said first position, and means, including said moving means, for holding said second member in said second position during a first revolution of rotation of said take-up spool.

3. Apparatus as defined in claim 1 wherein said first and second members each include first and second opposite ends with said first end of said second member being pivotably coupled to said first end of said first member, said second end of said first member including a recessed portion in a peripheral surface thereof for receiving said second end of said second member when the latter is in said second position.

4. Apparatus as defined in claim 3 further including means for biasing said second member toward said first position, and means for encompassing a major portion of the peripheral surface of said second end of said first member for maintaining said second end of said second member within said recessed portion during a major portion of each revolution of said film take-up spool.

5. Apparatus as defined in claim 4 wherein said moving means cooperates with said encompassing means to substantially surround said second end of said first member when said loading door is in said closed position.

6. Apparatus as defined in claim 1 further including means for mounting said moving means on said loading door in position to move said second member into said second position in response to movement of said loading door toward said closed position.

* * * * *